United States Patent
Harada et al.

(10) Patent No.: US 9,789,401 B2
(45) Date of Patent: Oct. 17, 2017

(54) GAME DEVICE, GAME SYSTEM, AND INFORMATION STORAGE MEDIUM

(71) Applicant: BANDAI NAMCO ENTERTAINMENT INC., Tokyo (JP)

(72) Inventors: Katsuhiro Harada, Tokyo (JP); Kohei Ikeda, Tokyo (JP); Kei Kudo, Kawasaki (JP); Hidenori Shibukawa, Tokyo (JP); Tsuyoshi Fukutomi, Tokyo (JP); Yukio Koshiba, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 94 days.

(21) Appl. No.: 15/008,082

(22) Filed: Jan. 27, 2016

(65) Prior Publication Data

US 2016/0220905 A1 Aug. 4, 2016

(30) Foreign Application Priority Data

Jan. 29, 2015 (JP) .................................. 2015-016056

(51) Int. Cl.
*A63F 13/53* (2014.01)
*A63F 13/56* (2014.01)
*A63F 13/833* (2014.01)
*A63F 13/5258* (2014.01)

(52) U.S. Cl.
CPC .......... *A63F 13/56* (2014.09); *A63F 13/5258* (2014.09); *A63F 13/833* (2014.09)

(58) Field of Classification Search
CPC ..... A63F 13/56; A63F 13/5258; A63F 13/833
See application file for complete search history.

(56) References Cited

U.S. PATENT DOCUMENTS

| | | | | |
|---|---|---|---|---|
| 6,093,105 | A | * 7/2000 | Morihira | A63F 13/10 273/440.1 |
| 2004/0046800 | A1 | * 3/2004 | Emerson | A63F 13/10 715/810 |
| 2004/0176164 | A1 | * 9/2004 | Kobayashi | A63F 13/10 463/30 |
| 2007/0270215 | A1 | * 11/2007 | Miyamoto | A63F 13/10 463/32 |
| 2008/0180438 | A1 | * 7/2008 | Sasaki | A63F 13/10 345/420 |
| 2009/0244064 | A1 | 10/2009 | Inokuchi et al. | |

(Continued)

FOREIGN PATENT DOCUMENTS

JP 2009-237680 A 10/2009

*Primary Examiner* — Corbett B Coburn
(74) *Attorney, Agent, or Firm* — Oliff PLC

(57) ABSTRACT

A game device controls a first virtual camera and a second virtual camera so that the first virtual camera and the second virtual camera are situated within an object space to be point-symmetrical, line-symmetrical, or plane-symmetrical with respect to a reference point, a reference line, or a reference plane that is defined by a first position linked to a first character and a second position linked to a second character. The game device determines whether to display the object space photographed by the first virtual camera or the object space photographed by the second virtual camera as a game image based on a selection instruction issued by a player.

9 Claims, 11 Drawing Sheets

(56) References Cited

U.S. PATENT DOCUMENTS

| | | | | |
|---|---|---|---|---|
| 2009/0251492 A1* | 10/2009 | Ohnishi | ............... | G06T 11/60 345/676 |
| 2010/0302238 A1* | 12/2010 | Yonemori | ............... | A63F 13/10 345/419 |
| 2011/0077078 A1* | 3/2011 | Taoka | ............... | A63F 13/10 463/31 |
| 2013/0225289 A1* | 8/2013 | Yoshimitsu | ............. | A63F 13/10 463/31 |

* cited by examiner

GAME DEVICE, GAME SYSTEM, AND INFORMATION STORAGE MEDIUM

Japanese Patent Application No. 2015-016056, filed on Jan. 29, 2015, is hereby incorporated by reference in its entirety.

BACKGROUND OF THE INVENTION

The present invention relates to a game device, a game system, and an information storage medium.

A game system that implements a game in which a first character and a second character that are respectively controlled (operated) by two players battle each other within an object space (virtual three-dimensional space) is known. A game image in which the first character and the second character that are situated on either the right side or the left side face and battle each other is displayed on a display observed by each player. Each player enjoys the game while controlling the player's character by operating an operation lever, an operation button, and the like so that the player's character makes an attack-defense motion (e.g., performs a technique while avoiding a technique performed by the opponent's character).

The game image is generated while controlling a virtual camera within the object space using various methods (e.g., the method disclosed in JP-A-2009-237680) taking account of the details of the game.

A known battle game is designed to control the virtual camera within the object space so that the first character and the second character are necessarily placed on either the right side or the left side within the game screen displayed on the game device operated by each player.

For example, when the initial position of the character that is operated by one of the players has been set to the right side, the initial position of the character that is operated by the other player is necessarily set to the left side. Specifically, it is impossible to allow both of the players to select the desired initial position when playing the game.

SUMMARY

Several aspects of the invention may provide a game device, a game system, and an information storage medium that make it possible for each player who plays a battle game or the like to arbitrarily select the basic position of the player's character within a game image with respect to the opponent's character.

According to a first aspect of the invention, there is provided game devices including a first game device and a second game device that exchange operation information about a first character that is controlled based on an operation performed by a first player and operation information about a second character that is controlled based on an operation performed by a second player in a game system that implements a game in which the first character and the second character battle each other within an object space, each of the game devices including:

a character control section that controls the first character and the second character within the object space based on the operation information about the first character and the operation information about the second character;

a virtual camera control section that controls a first virtual camera and a second virtual camera that respectively photograph at least one of the first character and the second character based on a position of at least one of the first character and the second character;

a display control section that displays the object space photographed by one of the first and second virtual cameras as a game image; and a position selection section that determines whether to set a basic position of one of the first and second characters within the game image to a right side or a left side with respect to a basic position of the other of the first and second characters based on a selection instruction issued by one of the first and second players to one of the first and second game devices, the virtual camera control section controlling the first virtual camera and the second virtual camera so that the first virtual camera and the second virtual camera are situated to be point-symmetrical, line-symmetrical, or plane-symmetrical with respect to a reference point, a reference line, or a reference plane that is defined by a first position within the object space that is linked to the first character and a second position within the object space that is linked to the second character, and determining whether to display the object space photographed by the first virtual camera or the object space photographed by the second virtual camera as the game image based on the basic position of one of the first and second characters determined by the position selection section.

According to a second aspect of the invention, there is provided a game system that implements a game in which a first character and a second character battle each other, the first character being controlled based on an operation performed by a first player, and the second character being controlled based on an operation performed by a second player, the game system including:

a character control section that controls the first character and the second character within an object space based on operation information about the first character and operation information about the second character;

a virtual camera control section that controls a first virtual camera and a second virtual camera that respectively photograph at least one of the first character and the second character based on a position of at least one of the first character and the second character;

a display control section that displays the object space photographed by one of the first and second virtual cameras as a game image; and a position selection section that determines whether to set a basic position of one of the first and second characters within the game image to a right side or a left side with respect to a basic position of the other of the first and second characters based on a selection instruction issued by one of the first and second players, the virtual camera control section controlling the first virtual camera and the second virtual camera so that the first virtual camera and the second virtual camera are situated to be point-symmetrical, line-symmetrical, or plane-symmetrical with respect to a reference point, a reference line, or a reference plane that is defined by a first position within the object space that is linked to the first character and a second position within the object space that is linked to the second character, and determining whether to display the object space photographed by the first virtual camera or the object space photographed by the second virtual camera as the game image based on the basic position of one of the first and second characters determined by the position selection section.

According to a third aspect of the invention, there is provided a computer-readable non-transitory information storage medium that stores a program that causes a computer to function as game devices including a first game device and a second game device that exchange operation information about a first character that is controlled based on an operation performed by a first player and operation information about a second character that is controlled based on an operation performed by a second player in a game system that implements a game in which the first character and the second character battle each other within an object space, the program causing the computer to further function as:

a character control section that controls the first character and the second character within the object space based on the operation information about the first character and the operation information about the second character;

a virtual camera control section that controls a first virtual camera and a second virtual camera that respectively photograph at least one of the first character and the second character based on a position of at least one of the first character and the second character;

a display control section that displays the object space photographed by one of the first and second virtual cameras as a game image; and a position selection section that determines whether to set a basic position of one of the first and second characters within the game image to a right side or a left side with respect to a basic position of the other of the first and second characters based on a selection instruction issued by one of the first and second players to the one of the first and second game devices, the virtual camera control section controlling the first virtual camera and the second virtual camera so that the first virtual camera and the second virtual camera are situated to be point-symmetrical, line-symmetrical, or plane-symmetrical with respect to a reference point, a reference line, or a reference plane that is defined by a first position within the object space that is linked to the first character and a second position within the object space that is linked to the second character, and determining whether to display the object space photographed by the first virtual camera or the object space photographed by the second virtual camera as the game image based on the basic position of one of the first and second characters determined by the position selection section.

According to a fourth aspect of the invention, there is provided a computer-readable non-transitory information storage medium that stores a program that causes a computer to function as a game system that implements a game in which a first character and a second character battle each other, the first character being controlled based on an operation performed by a first player, and the second character being controlled based on an operation performed by a second player, the program causing the computer to further function as:

a character control section that controls the first character and the second character within an object space based on operation information about the first character and operation information about the second character;

a virtual camera control section that controls a first virtual camera and a second virtual camera that respectively photograph at least one of the first character and the second character based on a position of at least one of the first character and the second character;

a display control section that displays the object space photographed by one of the first and second virtual cameras as a game image; and a position selection section that determines whether to set a basic position of one of the first and second characters within the game image to a right side or a left side with respect to a basic position of the other of the first and second characters based on a selection instruction issued by one of the first and second players, the virtual camera control section controlling the first virtual camera and the second virtual camera so that the first virtual camera and the second virtual camera are situated to be point-symmetrical, line-symmetrical, or plane-symmetrical with respect to a reference point, a reference line, or a reference plane that is defined by a first position within the object space that is linked to the first character and a second position within the object space that is linked to the second character, and determining whether to display the object space photographed by the first virtual camera or the object space photographed by the second virtual camera as the game image based on the basic position of one of the first and second characters determined by the position selection section.

Figure 1:
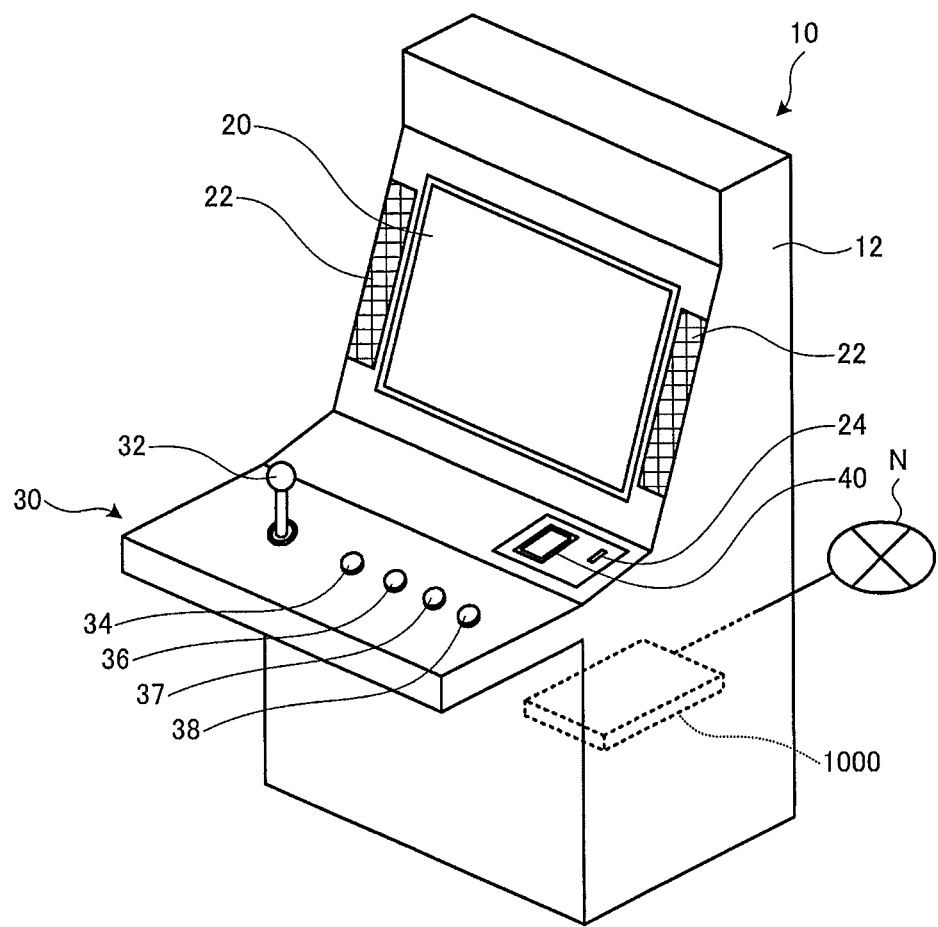
FIG. 1 is a schematic external view illustrating a game device included in a game system according to one embodiment of the invention.

DETAILED DESCRIPTION OF THE EMBODIMENT (1) According to one embodiment of the invention, game devices include a first game device and a second game device that exchange operation information about a first character that is controlled based on an operation performed by a first player and operation information about a second character that is controlled based on an operation performed by a second player in a game system that implements a game in which the first character and the second character battle each other within an object space, each of the game devices including:

a character control section that controls the first character and the second character within the object space based on the operation information about the first character and the operation information about the second character;

a virtual camera control section that controls a first virtual camera and a second virtual camera that respectively photograph at least one of the first character and the second character based on a position of at least one of the first character and the second character;

a display control section that displays the object space photographed by one of the first and second virtual cameras as a game image; and a position selection section that determines whether to set a basic position of one of the first and second characters within the game image to a right side or a left side with respect to a basic position of the other of the first and second characters based on a selection instruction issued by one of the first and second players to one of the first and second game devices, the virtual camera control section controlling the first virtual camera and the second virtual camera so that the first virtual camera and the second virtual camera are situated to be point-symmetrical, line-symmetrical, or plane-symmetrical with respect to a reference point, a reference line, or a reference plane that is defined by a first position within the object space that is linked to the first character and a second position within the object space that is linked to the second character, and determining whether to display the object space photographed by the first virtual camera or the object space photographed by the second virtual camera as the game image based on the basic position of one of the first and second characters determined by the position selection section.

Another embodiment of the invention relates to a game system. Another embodiment of the invention relates to an information storage medium that causes a computer to function as the game devices included in the game system.

According to the above embodiments, it is possible to provide a game device, a game system, and an information storage medium that make it possible for each player who plays a battle game or the like to arbitrarily select the position of the character (player's character) within the game image (game screen) with respect to the opponent's character, and enjoy the battle game or the like.

In particular, it is possible to change the placement of each character within the game image according to the request from each player without affecting the placement of each character within the object space (i.e., without affecting the battle between the characters within the object space). Therefore, each player can enjoy the game (game effects) within the object space while selecting the desired position (i.e., setting the character to the desired position).

Note that the selection instruction may be received prior to the start of the game.

The virtual camera control section may control the first virtual camera and the second virtual camera so that the first virtual camera and the second virtual camera are situated to be point-symmetrical or line-symmetrical with respect to the reference point or the reference line defined by the two-dimensional XY coordinates in an XYZ world coordinate system of the object space. In this case, the placement of the first character and the second character within the image photographed by the first virtual camera is opposite to the placement of the first character and the second character within the image photographed by the second virtual camera.

When using the above configuration, the height (Z-coordinate value) of the first virtual camera and the height (Z-coordinate value) of the second virtual camera may be controlled to be identical to each other.

When the reference plane is a plane that includes the reference line and is orthogonal to an XY plane in an XYZ world coordinate system of the object space, the virtual camera control section may place the first virtual camera and the second virtual to be symmetrical with respect to the reference plane.

The game device may include a display section that displays the game image, and an operation section that allows the player to input the operation information about the character. The first game device and the second game device may be provided separately, or may be provided integrally.

(2) In each of the game device, the game system, and the information storage medium, the virtual camera control section may control the first virtual camera and the second virtual camera so that the first virtual camera and the second virtual camera are situated to be point-symmetrical, line-symmetrical, or plane-symmetrical with respect to the reference point, the reference line, or the reference plane depending on the state of the battle between the first character and the second character.

For example, the virtual camera control section may control the first virtual camera and the second virtual camera so that the first virtual camera and the second virtual camera are situated to be point-symmetrical in an attack-defense mode in which the first player and the second player independently (respectively) operate the first character and the second player so that the first character and the second player battle with each other.

The virtual camera control section may control the first virtual camera and the second virtual camera so that the first virtual camera and the second virtual camera that are situated to be point-symmetrical are situated to be line-symmetrical in an effect mode in which one of the characters is caused to automatically attack the other character as a result of an attack input performed by the player so as to display the effect of the technique, for example. For example, the virtual camera control section may switch the mode from the attack-defense mode to the effect mode, and control the first virtual camera and the second virtual camera so that the first virtual camera and the second virtual camera that are situated to be point-symmetrical are situated to be line-symmetrical when sequential techniques (e.g., combo) performed by the player have succeeded.

(3) In the game device, the game system, and the information storage medium, the operation information about the first character and the operation information about the second character that are exchanged between the first game device and the second game device may include information about the selection instruction received by each of the first game device and the second game device, and the character control section may perform a process that converts movement instruction information included in the operation information about the first character and the operation information about the second character into movement instruction information that corresponds to a world coordinate system of the object space based on the selection instruction received by each of the first game device and the second game device.

According to this configuration, since the character control section performs the process that converts the movement instruction information included in the operation information about the first character and the operation information about the second character into the movement instruction information that corresponds to the world coordinate system of the object space based on the selection instruction received by each of the first game device and the second game device, each player who plays the battle game can naturally operate the character while watching the game screen even when each player has arbitrarily selected the basic position of the character within the game screen with respect to the opponent's character.

(4) According to another embodiment of the invention, a game system implements a game in which a first character and a second character battle each other, the first character being controlled based on an operation performed by a first player, and the second character being controlled based on an operation performed by a second player, the game system including:

a character control section that controls the first character and the second character within an object space based on operation information about the first character and operation information about the second character;

a virtual camera control section that controls a first virtual camera and a second virtual camera that respectively photograph at least one of the first character and the second character based on a position of at least one of the first character and the second character;

a display control section that displays the object space photographed by one of the first and second virtual cameras as a game image; and a position selection section that determines whether to set a basic position of one of the first and second characters within the game image to a right side or a left side with respect to a basic position of the other of the first and second characters based on a selection instruction issued by one of the first and second players, the virtual camera control section controlling the first virtual camera and the second virtual camera so that the first virtual camera and the second virtual camera are situated to be point-symmetrical, line-symmetrical, or plane-symmetrical with respect to a reference point, a reference line, or a reference plane that is defined by a first position within the object space that is linked to the first character and a second position within the object space that is linked to the second character, and determining whether to display the object space photographed by the first virtual camera or the object space photographed by the second virtual camera as the game image based on the basic position of one of the first and second characters determined by the position selection section.

Another embodiment of the invention relates to an information storage medium that causes a computer to function as the game system.

Exemplary embodiments of the invention are described below. Note that the following exemplary embodiments do not unduly limit the scope of the invention as stated in the claims. Note also that all of the elements described below should not necessarily be taken as essential elements of the invention.

1. Configuration

FIG. 1 is a schematic external view illustrating the configuration of a game device according to one embodiment of the invention.

A game device 10 according to one embodiment of the invention is configured to implement a battle game in which a first character that is controlled (operated) by a first player and a second character that is controlled (operated) by a second player battle each other within a given game space (object space).

The game device 10 includes a housing 12 that houses a processing section (computer) that performs a game process and the like, a display 20 that displays a game screen (game image), a speaker 22 that outputs game sound (e.g., effect sound and background music (BGM)), a game operation section 30, and a coin reception section 24 that receives a coin for playing the game.

The game device 10 includes a system board 1000 that is provided with a CPU, an image generation IC, a sound generation IC, and the like, and implements the battle game based on a game program and game data read from a memory (i.e., information storage medium) provided to the system board 1000, an operation signal input from a lever 32 and buttons, and the like.

The player who operates the game device 10 enjoys the battle game while watching the game screen displayed on the display 20. Specifically, the player enjoys the battle game by causing the player's character to make a motion by performing various game operations (e.g., technique type input and technique timing input) using the lever 32 and the buttons to battle with a player who operates another game device that is installed in the same store or a different store, or a computer character that is controlled by the CPU.

In one embodiment of the invention, the game operation section 30 includes the lever 32, a right hand button 34, a left hand button 36, a right foot button 37, and a left foot button 38. For example, the player can perform a "right punch" operation input by pressing the right hand button 34, perform a "left punch" operation input by pressing the left hand button 36, perform a "right kick" operation input by pressing the right foot button 37, and perform a "left kick" operation input by pressing the left foot button 38.

The player can perform another operation input by pressing a plurality of buttons at the same time, or pressing an arbitrary button while tilting the lever 32 (i.e., adjusting the tilt angle of the lever 32). For example, the player can perform various attack motion operation inputs by tilting the lever 32 in the direction in which the player's character moves forward while pressing an arbitrary button. The player can perform various defense motion operation inputs by tilting the lever 32 in the direction in which the player's character moves backward while pressing an arbitrary button.

For example, the player can cause the player's character displayed within the game screen to move the left hand, the right hand, the left hand, and the right hand, and perform a special technique (optionally after walking in the rightward direction) by sequentially pressing the left hand button 36, the right hand button 34, the left hand button 36, and the right hand button 34 (and optionally tilting the lever 32 in the rightward direction). Therefore, it is possible to cause the player's character to make a realistic motion.

When the player presses the right foot button 37 immediately after pressing the left hand button 36, the player's character sequentially throws a left jab and a left kick.

The game device 10 according to one embodiment of the invention employs a configuration that allows the player to select the position of the player's character within the game image with respect to the opponent when playing the battle game. The details thereof are described later.

Figure 2:
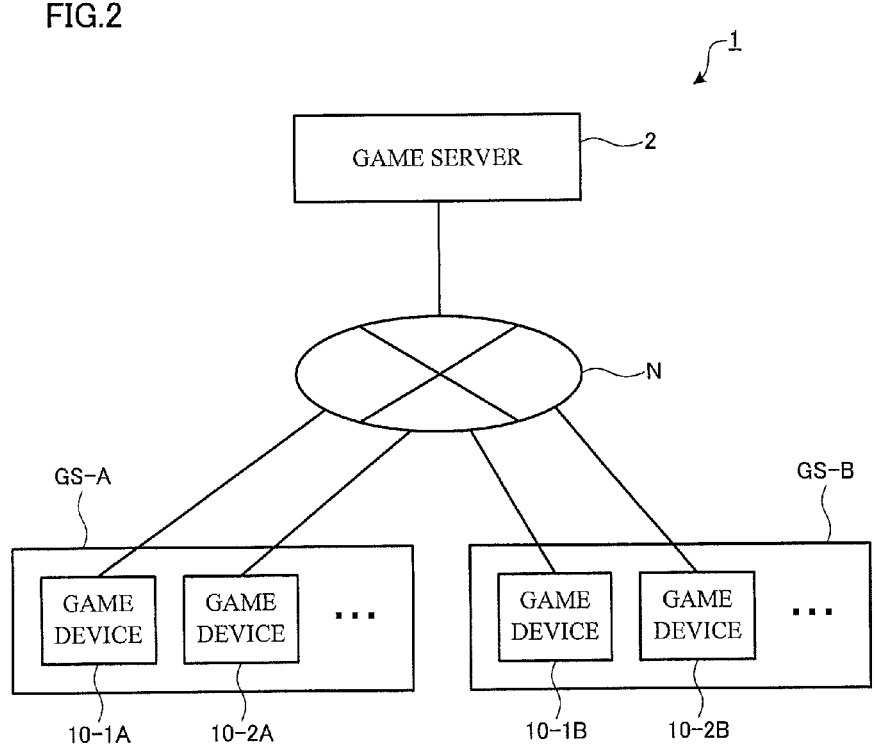
FIG. 2 is a schematic diagram illustrating the network configuration of a game system according to one embodiment of the invention.
Figure 3:
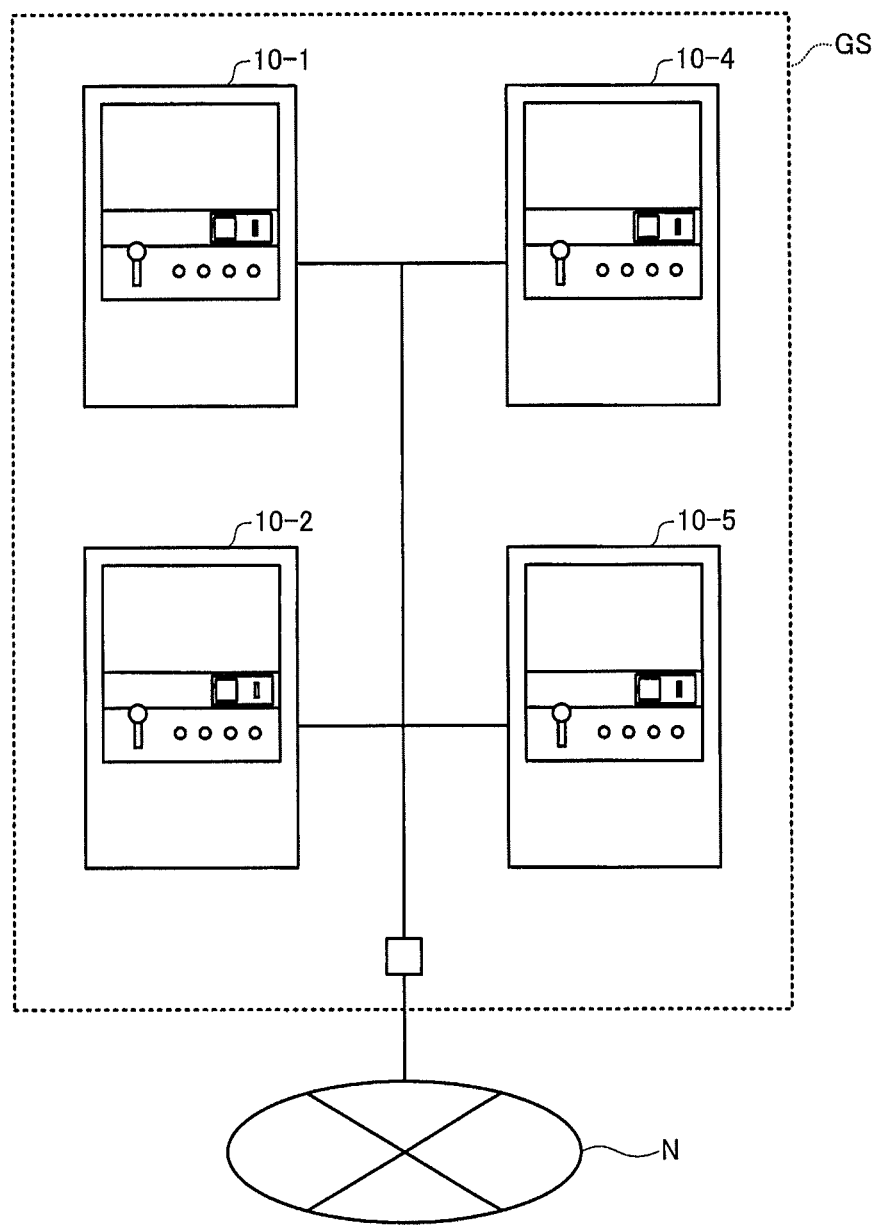
FIG. 3 is a schematic diagram illustrating the network configuration of a game system according to one embodiment of the invention.

FIG. 2 illustrates an example of an overall configuration of a game system 1 according to one embodiment of the invention, and FIG. 3 illustrates an example of the system configuration of each store GS.

As illustrated in FIG. 2, the game system 1 has a configuration in which each game device 10 (game terminal) installed in each store GS (GS-A, GS-B, . . . ) is connected to a game server 2 through a network N. The network N is a communication channel through which data can be exchanged.

When the game device 10 implements the battle game with another game device through the network N, the game device 10 successively receives an operation code from the other game device, and successively transmits an operation code based on an operation input performed using the game device 10 to the other game device in a predetermined cycle during the game. The game device 10 controls the motion of the character object and the like in the game space formed within the object space based on the operation code received from the other game device and the operation code based on the operation input performed using the game device 10. The game device 10 generates an image (game image) of the game space photographed using a virtual camera, and displays the generated game image on the display 20. The game device 10 also generates BGM and effect sound, and outputs the generated BGM and effect sound from the speaker 22.

The game server 2 manages the game devices 10 that participate in (are involved in) the network game, and controls the entire game system, for example.

2. Functional Block Diagram

Figure 4:
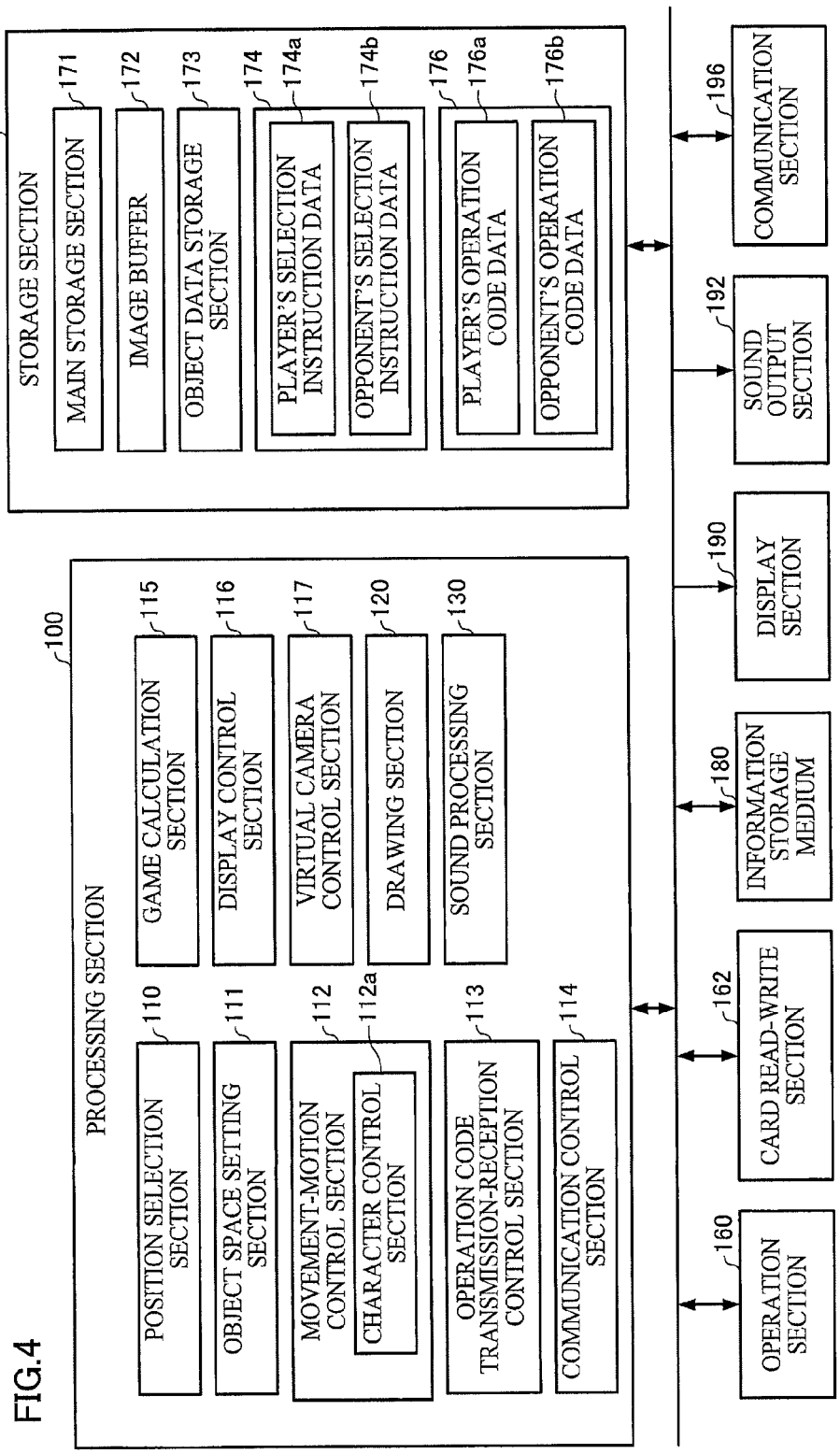
FIG. 4 is a functional block diagram illustrating an example of a game device according to one embodiment of the invention.

FIG. 4 illustrates an example of a functional block diagram of the game device 10 according to one embodiment of the invention. Note that the game device 10 according to one embodiment of the invention may have a configuration in which some of the elements (sections) illustrated in FIG. 4 are omitted.

An operation section 160 is an input device (controller) that allows the player (operator) to input information, and outputs the input information that has been input by the player to a processing section 100. The operation section 160 may be implemented by an analog lever, a button, a steering wheel, a microphone, a touch panel display, an acceleration sensor, or the like. The lever 32 and the buttons 34, 36, 37, and 38 illustrated in FIG. 2 correspond to the operation section 160, for example.

A card read-write section 162 reads and writes data from and into a game card under control of the processing section 100.

A storage section 170 stores a program and data defined in advance, and serves as a work area for the processing section 100, a communication section 196, and the like. The storage section 170 temporarily stores the results of calculations performed by the processing section 100 according to various programs, data (input data) input from the operation section 160, and the like. The function of the storage section 170 may be implemented by a RAM (VRAM) or the like.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like.

The processing section 100 performs various processes according to one embodiment of the invention based on a program (data) stored in the information storage medium 180. A program that causes a computer to function as each section according to one embodiment of the invention (i.e., a program that causes a computer to execute the process of each section) may be stored in the information storage medium 180.

In one embodiment of the invention, the information storage medium 180 stores a system program that causes the processing section 100 to implement various functions for controlling the entire game device 10, a game program that causes the processing section 100 to execute the battle game, various types of data, and the like. It is possible to cause the processing section 100 to implement various functions for executing the battle game by causing the processing section 100 to read and execute the game program.

Character setting data, stage setting data, and normal virtual camera setting data are stored in the information storage medium 180 in advance. Angle of view/line-of-sight direction/attitude information data for controlling the virtual camera, time limit count data, and the like are appropriately stored in the information storage medium 180 as information necessary for the game process.

The character setting data has a data structure in which basic information (e.g., model data, texture data, and motion data) about the character used in the battle game that is necessary for controlling the display and the motion of the character is linked to each character.

The stage setting data has a data structure in which information (e.g., model data and texture data) that is necessary for forming a stage (battle stage) within a virtual three-dimensional space is linked to each stage.

The normal virtual camera setting data includes normal setting information about the virtual camera that photographs the game space. For example, the normal virtual camera setting data includes information about the position, the angle of view, the moving path, the moving speed, the rotation direction, the rotational speed, a change in zoom, and the like of the virtual camera. In one embodiment of the invention, the normal virtual camera setting data also includes data for controlling a first virtual camera and a second virtual camera so that the first virtual camera and the second virtual camera are situated point-symmetrically, line-symmetrically, or plane-symmetrically within the object space (described later).

A display section 190 outputs an image generated according to one embodiment of the invention. The function of the display section 190 may be implemented by a CRT, an LCD, a touch panel display, a head mount display (HMD), or the like. The display 20 illustrated in FIG. 2 corresponds to the display section 190.

A sound output section 192 outputs sound generated according to one embodiment of the invention. The function of the sound output section 192 may be implemented by a speaker, a headphone, or the like.

The communication section 196 controls communication with the outside (e.g., another terminal or server). The function of the communication section 196 may be implemented by hardware such as a processor or a communication ASIC, a program, or the like.

Note that the game device 10 may receive a program (data) that causes a computer to function as each section according to one embodiment of the invention from an information storage medium or a storage section included in a server through a network, and store the received program (data) in the information storage medium 180 or the storage section 170. A case where the game device 10 (terminal) operates based on the program (data) received from the server is also intended to be included within the scope of the invention.

The processing section 100 (processor) performs a game process, an image generation process, a sound generation process, and the like based on data input from the operation section 160 and the card read-write section 162, a program, and the like.

The processing section 100 performs various processes using a main storage section 171 included in the storage section 170 as a work area. The function of the processing section 100 may be implemented by hardware such as a processor (e.g., CPU or DSP) or an ASIC (e.g., gate array), or a program.

The processing section 100 includes a position selection section 110, an object space setting section 111, a movement-motion control section 112, an operation code transmission-reception control section 113, a communication control section 114, a game calculation section 115, a display control section 116, a virtual camera control section 117, a drawing section 120, and a sound processing section 130. Note that the processing section 100 may have a configuration in which some of these sections are omitted.

Figure 9A:
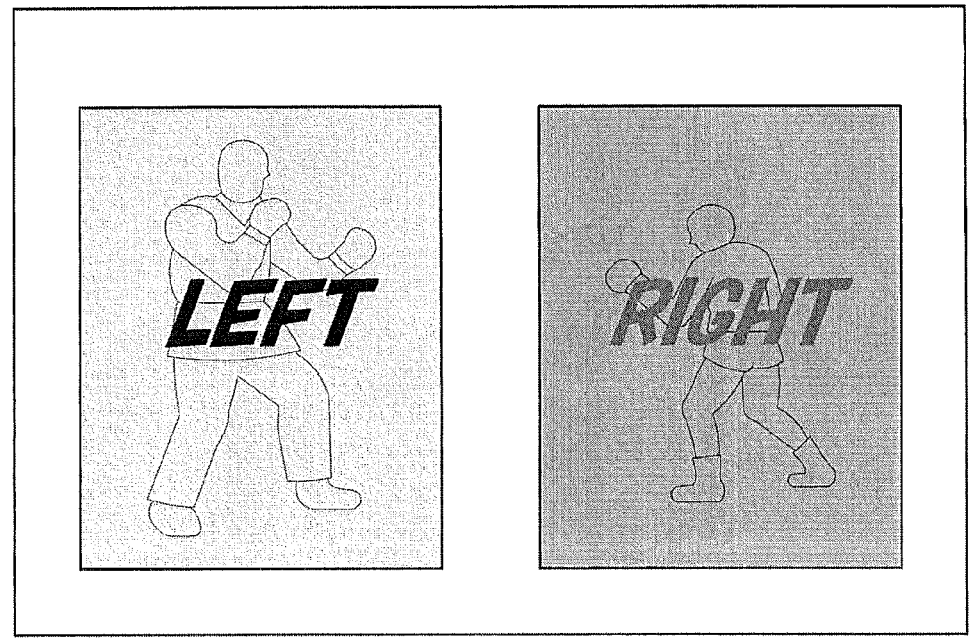
FIGS. 9A and 9B illustrate selection screens for selecting a basic position of a player's character.
Figure 9B:
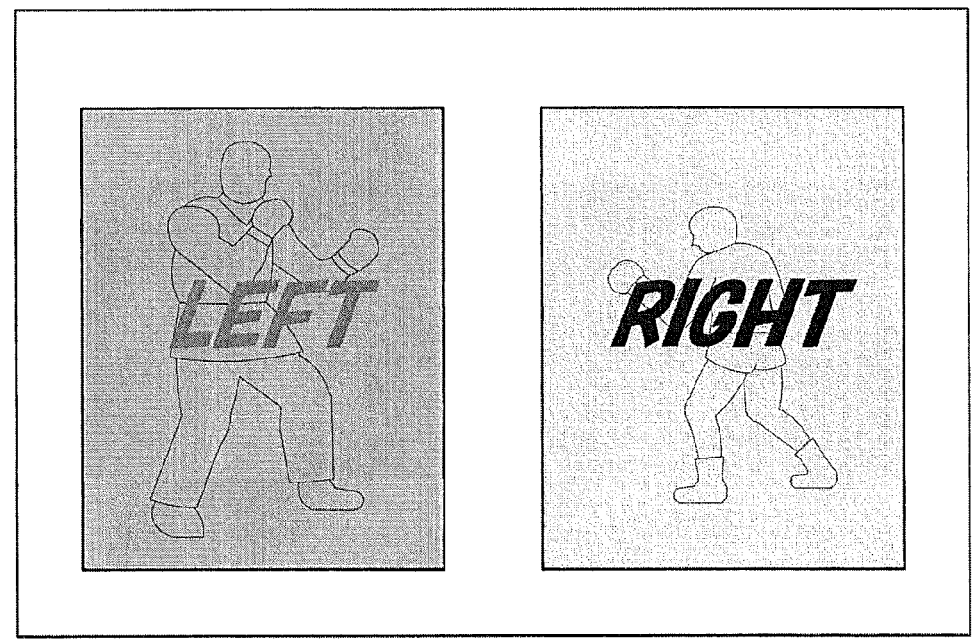

The position selection section 110 determines whether to set the basic position of the player's character within the game image to the right side or the left side with respect to the basic position of the opponent's character based on a selection instruction that has been issued by the player. Specifically, the position selection section 110 displays a selection screen that allows the player to issue the selection instruction (e.g., "RIGHT" and "LEFT" illustrated in FIGS. 9A and 9B) on the display section 190 so that the player can perform a right selection input or a left selection input by operating the lever 32 when the player has issued a request for playing the battle game, and the opponent has been determined. The data that represents the input selection instruction is stored in a selection instruction data storage section 174 included in the storage section 170 as player's selection instruction data 174a. The data that represents the selection instruction transmitted from the game device that is operated by the opponent is stored as opponent's selection instruction data 174b. Note that the term "basic position" used herein in connection with one embodiment of the invention refers to the initial position.

The game calculation section 115 performs a battle game process (i.e., a process proceeds with the battle game). For example, the game calculation section 115 performs a process that starts the game when game start conditions have been satisfied, a process that proceeds with the game, a process that terminates the game when game termination conditions have been satisfied, and a process that performs an ending process when the final stage has been cleared.

The object space setting section 111 performs a process that places an object in the object space (virtual three-dimensional space). For example, the object space setting section 111 performs a process that forms the game space (e.g., a stage in which characters battle with each other) within the virtual three-dimensional space. The object space setting section 111 also performs a process that places a display object (e.g., building, stadium, car, tree, pillar, wall, or map (topography)) within the object space. The term "object space" used herein refers to a virtual game space. For example, the term "object space" used herein refers to a space in which an object is placed in a three-dimensional coordinate (X, Y, Z) system (e.g., world coordinate system or virtual camera coordinate system).

For example, the object space setting section 111 places an object (i.e., an object formed by a primitive such as a polygon, a free-form surface, or a subdivision surface) in the world coordinate system. The object space setting section 111 determines the position and the rotation angle (synonymous with orientation or direction) of the object in the world coordinate system, and places the object at the determined position (X, Y, Z) and the determined rotation angle (rotation angles around the X, Y, and Z-axes).

The object space setting section 111 may perform a process that places an instruction object (e.g., special command input instruction object or marker) within a screen (two-dimensional image, screen, or screen coordinate system). The object space setting section 111 may place the instruction object within the object space (third-dimensional space, world coordinate system, virtual camera coordinate system, or model coordinate system).

The movement-motion control section 112 calculates the movement and the motion of the object within the object space. Specifically, the movement-motion control section 112 causes the object to move or make a motion (animation) within the object space based on the input information received from the operation section 160, a program (movement-motion algorithm), various types of data (motion data), and the like.

A character control section 112a controls the action of a character object (character) (i.e., main object) within the object space. Specifically, the character control section 112a performs a process that controls the motion of the player's character and the opponent's character based on the operation code based on an operation input performed using the operation section 160, the operation code acquired from the game device 10 that is operated by the opponent, and selection instruction data, a process that displays effects when a specific condition has been satisfied, an attack technique hit determination process, a hit damage process, and the like.

The character control section 112a performs the above process every frame (e.g., every ⅙₀th of a second). Note that the term "frame" used herein refers to a time unit when the object movement-motion process and the image generation process are performed.

The operation code transmission-reception control section 113 performs a process that transmits an operation code to the game device that is operated by the opponent in a predetermined cycle (e.g., a cycle that is equal to or shorter than the cycle in which the image generation process is performed) through the communication control section 114 and the communication section 196, and receives the operation code transmitted from the game device that is operated by the opponent, the operation code representing the input device included in the operation section 160 that has been operated.

The data that represents the input operation code is stored in an operation code data storage section 176 included in the storage section 170 as player's operation code data 176a. The data that represents the operation code transmitted from the game device that is operated by the opponent is stored as opponent's operation code data 176b.

The operation code transmission-reception control section 113 also performs a process that transmits the player's selection instruction data 174a stored in the selection instruction data storage section 174 to the game device that is operated by the opponent before the start of the game.

The display control section 116 performs a process that displays an image generated by the drawing section 120 on the display section 190.

The virtual camera control section 117 performs a process that controls the virtual camera (viewpoint) for generating an image viewed from a given (arbitrary) viewpoint within the object space. Specifically, when generating a three-dimensional image, the virtual camera control section 117 performs a process that controls the position (X, Y, Z) and the rotation angle (e.g., the rotation angle of the virtual camera when the virtual camera is rotated clockwise around each of the X, Y, and Z-axes) of the virtual camera in the world coordinate system. The virtual camera control section 117 controls at least one of the viewpoint position, the line-of-sight direction, the angle of view, the moving direction, and the moving speed of the virtual camera.

In one embodiment of the invention, the virtual camera control section 117 controls the virtual camera so as to follow the action of the character object (character).

Figure 5:
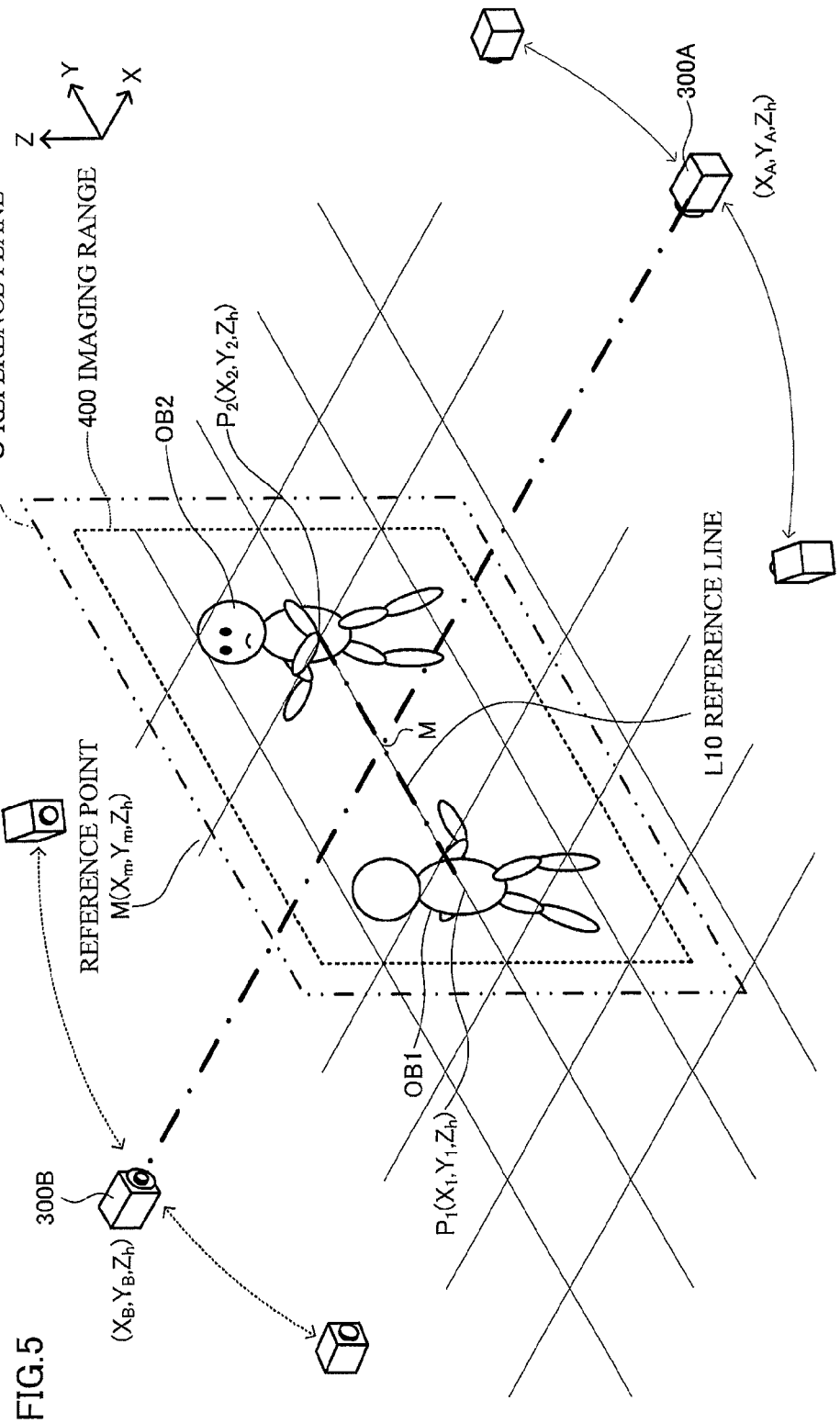
FIG. 5 is a diagram illustrating an example of a process that controls a first virtual camera and a second virtual camera.

As illustrated in FIG. 5, the virtual camera control section 117 controls a first virtual camera 300A and a second virtual camera 300B so that the first virtual camera 300A and the second virtual camera 300B are situated to be point-symmetrical, line-symmetrical, or plane-symmetrical with respect to a reference point M, a reference line L10, or a reference plane S that is defined by a first position P1 within the object space that is linked to a first character OB1 and a second position P2 within the object space that is linked to a second character OB2, the first character OB1 and the second character OB2 battling with each other within the object space. In this case, the virtual camera control section 117 controls the direction of the first virtual camera 300A and the direction of the second virtual camera 300B so that the reference point M is situated in the line-of-sight direction of the first virtual camera 300A and the line-of-sight direction of the second virtual camera 300B, and controls an imaging range 400 of the first virtual camera 300A and an imaging range 400 of the second virtual camera 300B so that the first character OB1 and the second character OB2 are situated on either the right side or the left side so as to face each other.

Note that the above process (i.e., point-symmetrical control process, line-symmetrical control process, and plane-symmetrical control process) performed on the first virtual camera 300A and the second virtual camera 300B is described later.

The communication control section 114 may perform a process that allows the game device 10 to exchange data with another game device or a server through a network.

Note that the game device 10 according to one embodiment of the invention may acquire network information necessary for a communication control process from a server, and manage the network information, for example. For example, the game device 10 may acquire and manage terminal identification information (ID) that is assigned to each game device (i.e., data assigned to identify each terminal that can participate in the online game), and packet destination information (e.g., IP address) that is linked to the terminal identification information.

In this case, the communication control section 114 performs a process that generates a packet that is transmitted to another terminal or a server, a process that designates the IP address or the port number of the packet destination terminal, a process that stores data included in the received packet in the storage section 170, a process that analyzes the received packet, and a process that controls an additional packet transmission-reception process, for example.

The communication control section 114 according to one embodiment of the invention also performs a process that transmits and receives data in a predetermined cycle (e.g., every second) after the game device 10 has connected to another terminal or a server (i.e., after connection between a first terminal and a second terminal has been established) until the game device 10 disconnects from the other terminal or the server.

When the network system includes a plurality of terminals, a peer-to-peer (P2P) system may be used so that the plurality of terminals execute the online game while exchanging data, or a client-server system may be used so that the plurality of terminals execute the online game while exchanging data (information) through the server 2. The network system according to one embodiment of the invention may utilize wireless data communication instead of cable data communication.

The drawing section 120 performs a drawing process based on the results for various processes performed by the processing section 100 to generate an image, and outputs the generated image to the display section 190. Specifically, the drawing section 120 generates an image viewed from the virtual camera within the object space.

For example, the drawing section 120 receives object data (model data) including vertex data (e.g., vertex position coordinates, texture coordinates, color data, normal vector, or alpha-value) of each vertex of the object (model), and performs a vertex process (shading using a vertex shader) based on the vertex data included in the received object data. When performing the vertex process, the image generation section 120 may perform a vertex generation process (tessellation, surface division, or polygon division) for dividing the polygon, if necessary.

In the vertex process, the drawing section 120 performs a vertex movement process and a geometric process (e.g., coordinate transformation (world coordinate transformation or field-of-view transformation (camera coordinate transformation)), clipping, perspective transformation (projection transformation), and viewport transformation) according to a vertex processing program (vertex shader program or first shader program), and changes (updates or adjusts) the vertex data of each vertex that forms the object based on the processing results.

The drawing section 120 performs a rasterization process (scan conversion) based on the vertex data subjected to the vertex process to link the surface of the polygon (primitive) to pixels. The drawing section 120 then performs a pixel process (shading using a pixel shader or a fragment process) that draws the pixels that form the image (fragments that form the display screen). In the pixel process, the drawing section 120 determines the drawing color of each pixel that forms the image by performing various processes such as a texture readout (texture mapping) process, a color data setting/change process, a translucent blending process, and an anti-aliasing process according to a pixel processing program (pixel shader program or second shader program), and outputs (draws) the drawing color of the object subjected to perspective transformation to (in) an image buffer 172 (i.e., a buffer that can store image information on a pixel basis (VRAM, rendering target, or frame buffer)). Specifically, the pixel process includes a per-pixel process that sets or changes the image information (e.g., color, normal, luminance, and alpha value) on a pixel basis. The drawing section 120 thus generates an image viewed from the virtual camera (given viewpoint) within the object space.

Note that the vertex process and the pixel process are implemented by hardware that enables a programmable polygon (primitive) drawing process (i.e., programmable shader (vertex shader and pixel shader)) according to a shader program written in shading language. The programmable shader enables a programmable per-vertex process and a per-pixel process, and increases the degree of freedom relating to the drawing process. Therefore, the representation capability can be significantly improved as compared with a fixed drawing process using hardware.

The drawing section 120 performs a geometric process, a texture mapping process, a hidden surface removal process, an alpha-blending process, and the like when drawing the object.

In the geometric process, the drawing section 120 subjects the object to a coordinate transformation process, a clipping process, a perspective projection transformation process, a light source calculation process, and the like. The object data (e.g. object's vertex position coordinates, texture coordinates, color data (brightness data), normal vector, or alpha-value) obtained by the geometric process (perspective projection transformation process) is stored in the storage section 170.

The term "texture mapping" refers to a process that maps a texture (texel value) stored in the storage section 170 onto the object. Specifically, the drawing section 120 reads the texture (surface properties such as color (RGB) and alpha-value) from the storage section 170 using the texture coordinates set (assigned) to the vertices of the object, for example. The drawing section 120 maps the texture (two-dimensional image) read from the storage section 170 onto the object. In this case, the drawing section 120 performs a pixel-texel link process, a bilinear interpolation process (texel interpolation process), and the like.

The drawing section 120 may perform a hidden surface removal process using a Z-buffer method (depth comparison method or Z-test) that utilizes a Z-buffer (depth buffer) that stores the Z-value (depth information) of the drawing pixel. Specifically, the drawing section 120 refers to the Z-value stored in the Z-buffer when drawing the drawing pixel that corresponds to the primitive of the object. The drawing section 120 compares the Z-value stored in the Z-buffer with the Z-value of the drawing pixel that corresponds to the primitive. When the Z-value of the drawing pixel is the Z-value in front of the virtual camera (e.g., a small Z-value), the drawing section 120 draws the drawing pixel, and updates the Z-value stored in the Z-buffer with a new Z-value.

The term "alpha-blending" refers to a translucent blending process (e.g., normal alpha-blending, additive alpha-blending, or subtractive alpha-blending) based on the alpha-value (A-value).

For example, a drawing color C1 (overwrite color) that is to be drawn in the image buffer 172 and a drawing color C2 (base color) that has been drawn in the image buffer 172 (rendering target) are subjected to a linear blending process based on the alpha-value. Specifically, the final drawing color C is calculated by "C=C1*alpha+C2*(1−alpha)".

Note that the alpha-value is information that can be linked to each pixel (texel or dot), such as additional information other than color information. The alpha-value may be used as mask information, translucency (equivalent to transparency or opacity) information, bump information, or the like.

When the terminal (game device) exchanges data with another terminal (second terminal) through a network to implement a multi-player online game, the drawing section 120 performs a process that generates an image viewed from the virtual camera that follows the movement of the object operated by the terminal (first terminal) (i.e., the virtual camera controlled by the terminal (first terminal)). Specifically, each terminal independently performs the drawing process.

The sound generation section 130 performs a sound generation process based on the results of various processes performed by the processing section 100 to generate game sound (e.g., BGM, effect sound, or voice), and outputs the generated game sound to the sound output section 192.

Note that the terminal according to one embodiment of the invention may be controlled to implement a single-player mode that allows only one player to play the game, or may be controlled to implement a multi-player mode that allows a plurality of players to play the game. When the terminal is controlled to implement the multi-player mode, the terminal may exchange data with another terminal through a network to perform the game process, or may perform the game process based on information input from a plurality of input sections.

3. Point-Symmetrical Control Process, Line-Symmetrical Control Process, and Plane-Symmetrical Control Process on Virtual Camera The point-symmetrical control process, the line-symmetrical control process, and the plane-symmetrical control process performed on the first virtual camera 300A and the second virtual camera 300B are described below.

In FIG. 5, a position within the object space is specified using the XYZ world coordinate system, X and Y represent the coordinate position in a horizontal plane, and Z represents the coordinate position in the vertical direction. In FIG. 5, the coordinates of the first position P1 linked to the first character object (character) OB1 and the coordinates of the second position P2 linked to the second character object (character) OB2 are as follows.

$$P1=(X1,Y1,Zh)$$

$$P2=(X2,Y2,Zh)$$

A line that connects the first position P1 and the second position P2 is referred to as the reference line L10, and the center point of the reference line L10 is referred to as the reference point M.

The coordinates of the reference point M are as follows.

$$M=((X2-X1)/2,(Y2-Y1)/2,Zh)$$

A plane that includes the reference line L10 and is orthogonal to the XY horizontal plane is referred to as the reference plane S.

<Point-Symmetrical Control Process on Virtual Camera>

The point-symmetrical control process performed on the first virtual camera 300A and the second virtual camera 300B is described below.

In FIG. 5, the first virtual camera 300A and the second virtual camera 300B are placed to be symmetrical with respect to the reference point M. The position and the attitude of the first virtual camera 300A and the position and the attitude of the second virtual camera 300B are controlled so that the first virtual camera 300A and the second virtual camera 300B are situated to be point-symmetrical with respect to the reference point M.

The point-symmetrical control process may control the first virtual camera 300A and the second virtual camera 300B so that the first virtual camera 300A and the second virtual camera 300B are situated to be point-symmetrical with respect to the reference point M in an XY-dimensional plane (XY plane) that includes the reference point M. In this case, it is preferable to control the attitude of the first virtual camera 300A and the attitude of the second virtual camera 300B so that the reference point M is situated in the line-of-sight direction of the first virtual camera 300A and the line-of-sight direction of the second virtual camera 300B.

Figure 8:
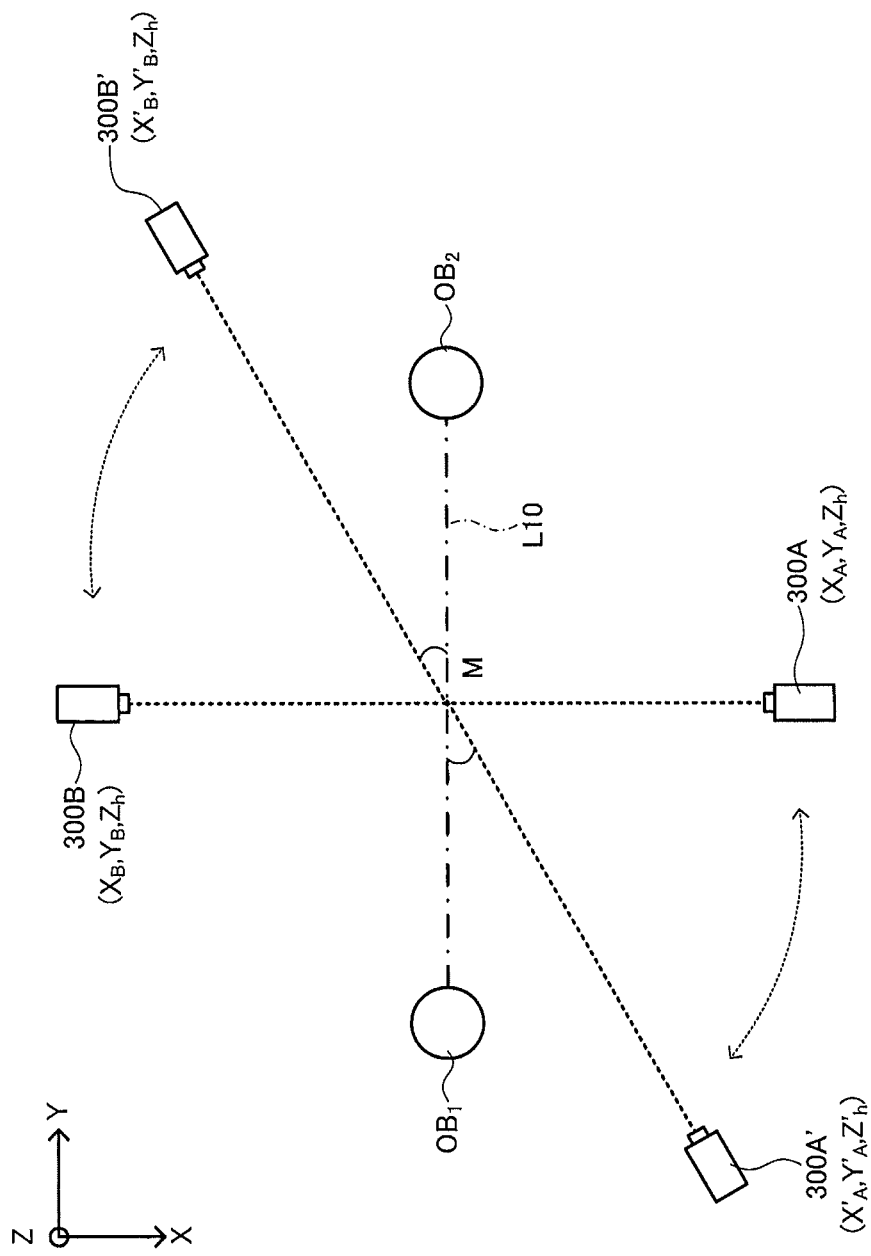
FIG. 8 is a diagram illustrating an example of a point-symmetrical control process performed on a first virtual camera and a second virtual camera.

FIG. 8 illustrates an example of the point-symmetrical control process. FIG. 8 illustrates an example in which the point-symmetrical control process is performed while maintaining the Z-axis coordinate value (height) of the first virtual camera 300A and the Z-axis coordinate value (height) of the second virtual camera 300B to be equal to the Z-axis coordinate value (Zh) of the reference point M.

In one embodiment of the invention, the first virtual camera 300A and the second virtual camera 300B are placed to be point-symmetrical in the XY-dimensional plane that includes the reference point M along a line that includes the reference point M and is orthogonal to the reference line L10. The above placement is the basic placement used for the point-symmetrical control process.

The imaging range 400 of the first virtual camera 300A and the imaging range 400 of the second virtual camera 300B are controlled so that the first character OB1 and the second character OB2 are displayed on either the right side or the left side within the game screen so as to face each other.

Figure 10A:
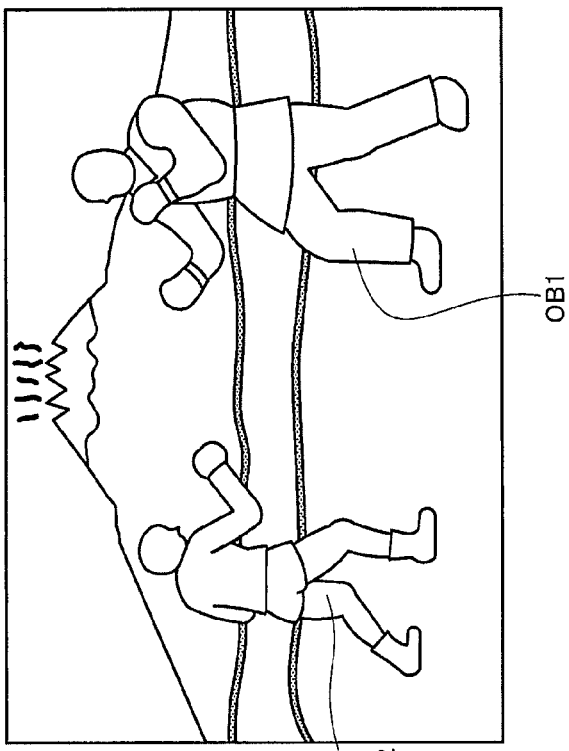
FIGS. 10A and 10B illustrate examples of a game screen.

In the game screen illustrated in FIG. 10A that is photographed by the first virtual camera 300A, the basic position of the first character OB1 is set to the left side, and the basic position of the second character OB2 is set to the right side.

Figure 10B:
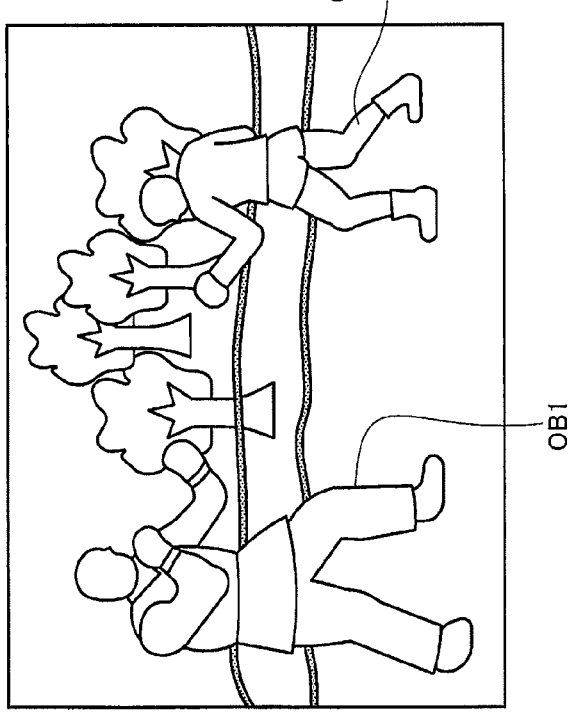

In the game screen illustrated in FIG. 10B that is photographed by the second virtual camera 300B, the basic position of the first character OB1 and the basic position of the second character OB2 are opposite to the basic position of the first character OB1 and the basic position of the second character OB2 within the game screen that is photographed by the first virtual camera 300A. Specifically, the basic position of the first character OB1 is set to the right side, and the basic position of the second character OB2 is set to the left side (see FIG. 10B).

As illustrated in FIG. 8, the first virtual camera 300A and the second virtual camera 300B that are placed to implement the basic placement used for the point-symmetrical control process may optionally be moved along a given moving path while maintaining the first virtual camera 300A and the second virtual camera 300B to be point-symmetrical with respect to the reference point M. In this case, it is preferable to control the attitude of the first virtual camera 300A and the attitude of the second virtual camera 300B so that the reference point M is situated in the line-of-sight direction of the first virtual camera 300A and the line-of-sight direction of the second virtual camera 300B.

For example, when the first virtual camera 300A and the second virtual camera 300B are respectively moved to a position 300A' and a position 300B' (see FIG. 8) while maintaining the first virtual camera 300A and the second virtual camera 300B to be point-symmetrical with respect to the reference point M, a game image in which the second character OB2 is displayed diagonally (from the front side) over the shoulder of the first character OB1 is obtained by the first virtual camera 300A situated at the position 300A', and a game image in which the first character OB1 is displayed diagonally (from the front side) over the shoulder of the second character OB2 is obtained by the second virtual camera 300B situated at the position 300B'.

Although an example in which the point-symmetrical control process is performed while maintaining the Z-axis coordinate value of the first virtual camera 300A and the Z-axis coordinate value of the second virtual camera 300B to be equal to the Z-axis coordinate value (Zh) of the reference point M has been described above, the point-symmetrical control process may be three-dimensionally performed on the first virtual camera 300A and the second virtual camera 300B so that the X-coordinate value and the Y-coordinate value of the first virtual camera 300A and the X-coordinate value and the Y-coordinate value of the second virtual camera 300B in the XY-plane are point-symmetrical with respect to the reference point M (see FIG. 8) while changing the Z-axis coordinate value (Zh) with the proviso that the Z-axis coordinate value of the first virtual camera 300A and the Z-axis coordinate value of the second virtual camera 300B are set to an identical value.

<Line-Symmetrical Control Process on Virtual Camera>

The line-symmetrical control process performed on the first virtual camera 300A and the second virtual camera 300B is described below.

In FIG. 5, the first virtual camera 300A and the second virtual camera 300B are placed to be line-symmetrical with respect to the reference line L10. The position and the attitude of the first virtual camera 300A and the second virtual camera 300B are controlled so that the first virtual camera 300A and the second virtual camera 300B are situated to be line-symmetrical with respect to the reference line L10.

In one embodiment of the invention, the line-symmetrical control process may control the first virtual camera 300A and the second virtual camera 300B so that the first virtual camera 300A and the second virtual camera 300B are line-symmetrical with respect to the reference line L10 in an XY-dimensional plane that includes the reference line L10. In this case, it is preferable to control the attitude of the first virtual camera 300A and the attitude of the second virtual camera 300B so that the reference point M is situated in the line-of-sight direction of the first virtual camera 300A and the line-of-sight direction of the second virtual camera 300B.

Figure 7:
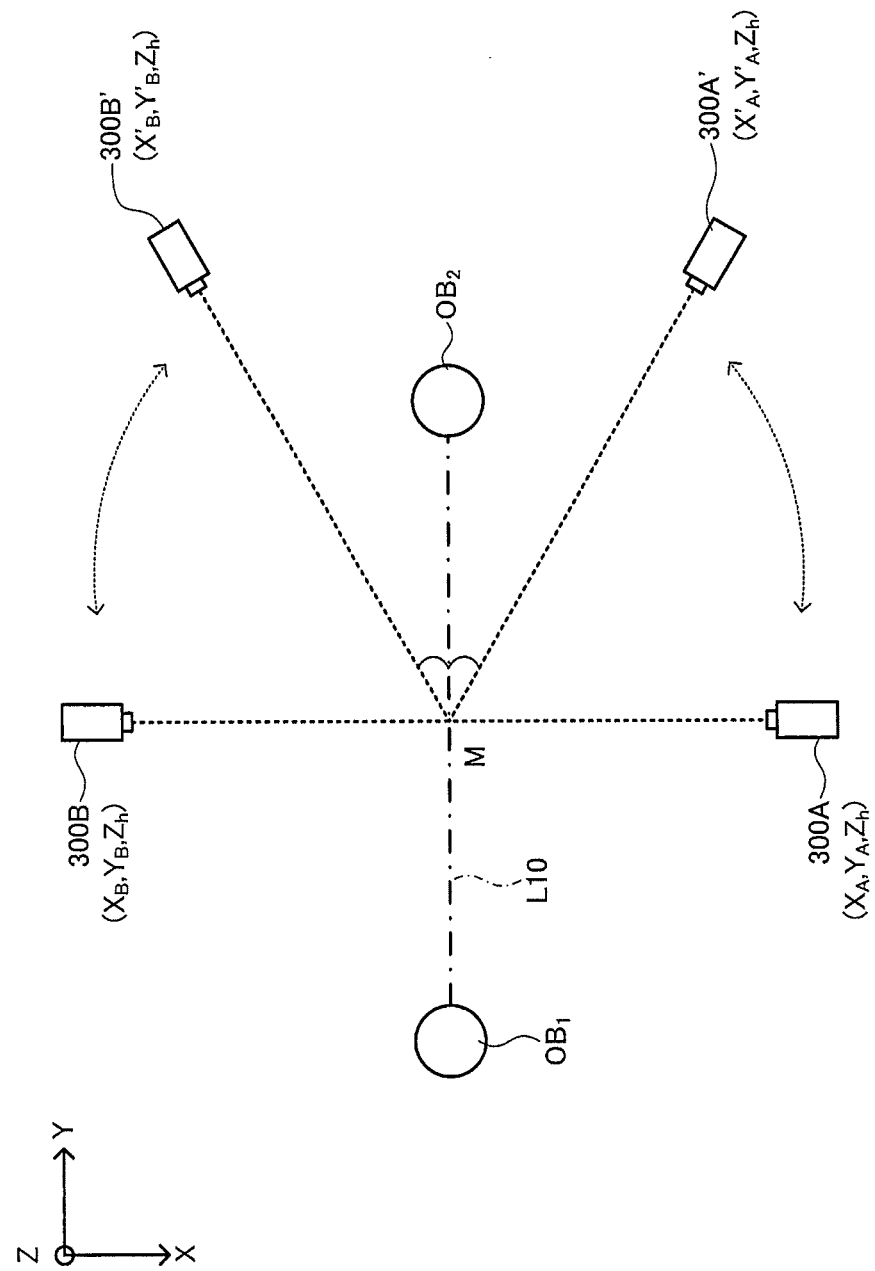
FIG. 7 is a diagram illustrating an example of a line-symmetrical control process performed on a first virtual camera and a second virtual camera.

FIG. 7 illustrates an example of the line-symmetrical control process. FIG. 7 illustrates an example in which the line-symmetrical control process is performed while maintaining the Z-axis coordinate value (height) of the first virtual camera 300A and the Z-axis coordinate value (height) of the second virtual camera 300B to be equal to the Z-axis coordinate value (Zh) of the reference point M.

In one embodiment of the invention, the first virtual camera 300A and the second virtual camera 300B are placed to be line-symmetrical in the XY-dimensional plane that includes the reference point M along a line that includes the reference point M and is orthogonal to the reference line L10. The above placement is the basic placement used for the line-symmetrical control process.

The imaging range 400 of the first virtual camera 300A and the imaging range 400 of the second virtual camera 300B are controlled so that the first character OB1 and the second character OB2 are displayed on either the right side or the left side within the game screen so as to face each other.

In the game screen that is photographed by the first virtual camera 300A, the basic position of the first character OB1 is set to the left side, and the basic position of the second character OB2 is set to the right side.

In the game screen that is photographed by the second virtual camera 300B, the basic position of the first character OB1 and the basic position of the second character OB2 are opposite to the basic position of the first character OB1 and the basic position of the second character OB2 within the game screen that is photographed by the first virtual camera 300A. Specifically, the basic position of the first character OB1 is set to the right side, and the basic position of the second character OB2 is set to the left side.

In one embodiment of the invention, the first virtual camera 300A and the second virtual camera 300B may optionally be moved along a given moving path while maintaining the first virtual camera 300A and the second virtual camera 300B to be line-symmetrical with respect to the reference line L10. In this case, it is preferable to control the position and the attitude of the first virtual camera 300A and the position and the attitude of the second virtual camera 300B so that the reference point M is situated in the line-of-sight direction of the first virtual camera 300A and the line-of-sight direction of the second virtual camera 300B.

For example, when the first virtual camera 300A and the second virtual camera 300B are respectively moved to a position 300A' and a position 300B' (see FIG. 7) while maintaining the first virtual camera 300A and the second virtual camera 300B to be line-symmetrical with respect to the reference line L10, a game image in which the first character OB1 is displayed diagonally (from the front side) over the shoulder of the second character OB2 is obtained by the first virtual camera 300A situated at the position 300A' and the second virtual camera 300B situated at the position 300B'.

Although an example in which the line-symmetrical control process is performed while maintaining the Z-axis coordinate value of the first virtual camera 300A and the Z-axis coordinate value of the second virtual camera 300B to be equal to the Z-axis coordinate value (Zh) of the reference point M has been described above, the line-symmetrical control process may be three-dimensionally performed on the first virtual camera 300A and the second virtual camera 300B so that the X-coordinate value and the Y-coordinate value of the first virtual camera 300A and the X-coordinate value and the Y-coordinate value of the second virtual camera 300B in the XY-plane are line-symmetrical with respect to the reference line L10 (see FIG. 7) while changing the Z-axis coordinate value (Zh) with the proviso that the Z-axis coordinate value of the first virtual camera 300A and the Z-axis coordinate value of the second virtual camera 300B are set to an identical value.

<Plane-Symmetrical Control Process on Virtual Camera>

The plane-symmetrical control process performed on the first virtual camera 300A and the second virtual camera 300B is described below.

In FIG. 5, the first virtual camera 300A and the second virtual camera 300B are placed to be plane-symmetrical with respect to the reference plane S. The position and the attitude of the first virtual camera 300A and the position and the attitude of the second virtual camera 300B are controlled so that the first virtual camera 300A and the second virtual camera 300B are situated to be plane-symmetrical with respect to the reference plane S.

In one embodiment of the invention, the plane-symmetrical control process three-dimensionally controls the first virtual camera 300A and the second virtual camera 300B so that the X-coordinate value and the Y-coordinate value of the first virtual camera 300A and the X-coordinate value and the Y-coordinate value of the second virtual camera 300B in the XY-plane are line-symmetrical with respect to the reference line L10 (see FIG. 5) while changing the Z-axis coordinate value (Zh) with the proviso that the Z-axis coordinate value of the first virtual camera 300A and the Z-axis coordinate value of the second virtual camera 300B are set to an identical value. Specifically, the plane-symmetrical control process corresponds to the above variation of the line-symmetrical control process.

The first virtual camera 300A and the second virtual camera 300B may optionally be moved along a given moving path while maintaining the first virtual camera 300A and the second virtual camera 300B to be plane-symmetrical with respect to the reference plane S. In this case, it is preferable to control the position and the attitude of the first virtual camera 300A and the position and the attitude of the second virtual camera 300B so that the reference point M is situated in the line-of-sight direction of the first virtual camera 300A and the line-of-sight direction of the second virtual camera 300B.

4. Method

The method according to one embodiment of the invention is described below.

<Selection Instruction>

The game device 10 according to one embodiment of the invention employs a configuration in which whether to set the basic position of the player's character within the game screen to the right side or the left side with respect to the basic position of the opponent's character is determined based on the selection instruction that has been issued by the player.

The selection instruction that has been issued by the player is stored in the selection instruction data storage section 174 as the player's selection instruction data 174a, and transmitted to the game device that is operated by the opponent. The game device 10 receives the selection instruction data selected by the opponent from the game device that is operated by the opponent, and stores the received selection instruction data in the selection instruction data storage section 174 as the opponent's selection instruction data 174b.

An image of the object space photographed by the first virtual camera 300A or the second virtual camera 300B that corresponds to the basic position determined by the selection instruction issued by each player is displayed on the display 20 of each game device 10 as the game image.

According to this configuration, since each player can arbitrarily set the basic position of the character OB1 to the right side or the left side, and display the resulting game screen, each player can enjoy the battle game using the desired basic position.

<Operation Code Data>

The game device 10 according to one embodiment of the invention writes the input signal from the operation section 30 (i.e., the input signal from the lever 32 that is used to instruct to move the character OB in the forward, backward, rightward, or leftward direction, and the input signals from the buttons 34, 36, and 38) into the operation code data storage section 176 as the player's operation code data 176a in a predetermined cycle (e.g., every 1/60th of a second), and transmits the input signal to the game device that is operated by the opponent. Likewise, the game device 10 writes (stores) the opponent's operation code data 176b transmitted from the game device that is operated by the opponent into the operation code data storage section 176 in a predetermined cycle.

According to one embodiment of the invention, the player can set (select) the basic position of the player's character OB1 to the right side or the left side within the game screen using the game device 10 (see above). Therefore, the direction indicated by the rightward-leftward direction input instruction issued using the lever 32 differs between a case where the basic position of the player's character OB is set to the right side within the game screen and a case where the basic position of the player's character OB is set to the left side within the game screen.

The game device 10 according to one embodiment of the invention is configured so that the character control section 112a converts the direction input instruction (particularly the rightward-leftward direction input instruction) included in the player's operation code data 176a and the direction input instruction (particularly the rightward-leftward direction input instruction) included in the opponent's operation code data 176b into the direction instruction data using the world coordinate system of the object space based on the player's selection instruction data 174*a* and the opponent's selection instruction data 174*b*, and controls the characters OB1 and OB2.

According to this configuration, each player who plays the battle game can naturally operate the character while watching the game screen.

<Virtual Camera Control>

The game device 10 according to one embodiment of the invention controls the first virtual camera 300A and the second virtual camera 300B so that the first virtual camera 300A and the second virtual camera 300B are situated to be point-symmetrical, line-symmetrical, or plane-symmetrical with respect to the reference point M, the reference line L10, or the reference plane S. In particular, the game device 10 according to one embodiment of the invention controls the first virtual camera 300A and the second virtual camera 300B while selecting an appropriate mode from a point-symmetrical control mode, a line-symmetrical control mode, and a plane-symmetrical control mode depending on the state of the game and the like.

It is possible to provide a highly effective game image corresponding to the state of the game by thus switching the virtual camera control mode.

5. Process Flowchart

Figure 11:
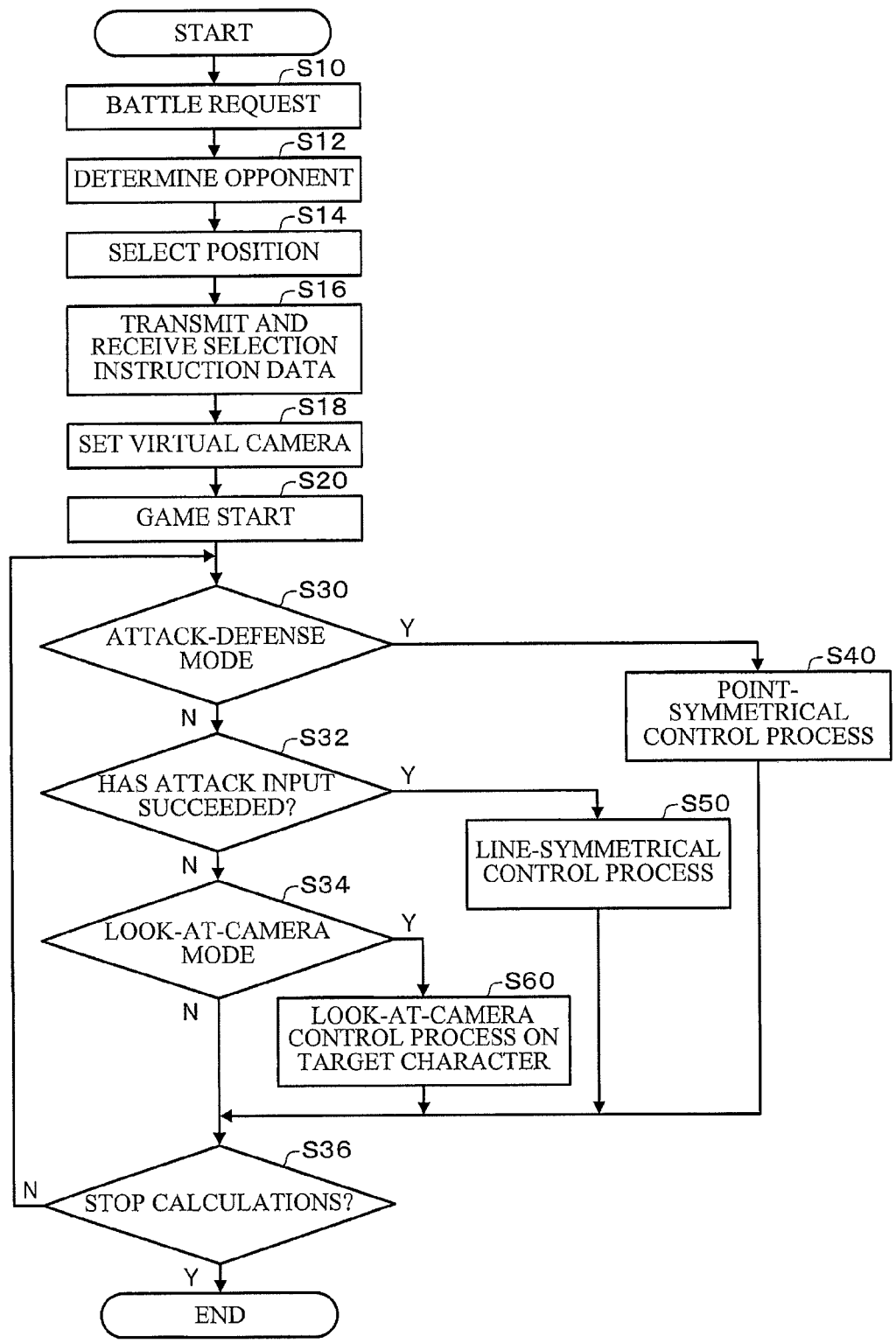
FIG. 11 is a flowchart illustrating an example of a process that is performed by a game system according to one embodiment of the invention.

An example of the process performed by the game system according to one embodiment of the invention is described below with reference to FIG. 11 (flowchart) (steps S10 to S20).

When the player has issued a battle game play request using the game device 10 (step S10), a request signal is transmitted to the game server 2 through the network N. The game server 2 determines the opponent of the player in the battle game (i.e., determines the game device 10 that is operated by the opponent), and notifies the game devices 10 to that effect (step S12).

In this case, the game server 2 may transmit an ID or the like that represents each game device 10 to the game device 10 that is operated by the player and the game device 10 that is operated by the opponent, or the game device 10 that is operated by the player and the game device 10 that is operated by the opponent may exchange an ID or the like that represents each game device 10.

When the opponent has been determined, the selection screen (see FIGS. 9A and 9B) that allows each player to select the basic position of the character OB1 or OB2 is displayed within the game screen displayed on each game device 10.

An example in which the player who operates the character OB1 selects the basic position of the character OB1 using the game device 10 is described below.

The player selects "LEFT" or "RIGHT" using the lever 32 (step S14).

When the player has selected "LEFT" (see FIG. 9A), the basic position of the character OB1 is set to the left side within the game screen. When the player has selected "RIGHT" (see FIG. 9B), the basic position of the character OB1 is set to the right side within the game screen.

The selection instruction that has been issued by each player is stored in the selection instruction data storage section 174 as the player's selection instruction data 174*a*, and transmitted to the game device that is operated by the opponent (step S16). The game device 10 receives the selection instruction data from the game device 10 that is operated by the opponent, and stores the received selection instruction data in the selection instruction data storage section 174 as the opponent's selection instruction data 174*b*.

When the basic position of the character OB1 has been selected (input), the virtual camera control section 117 included in each game device 10 determines whether to use the signal from the first virtual camera 300A or the second virtual camera 300B based on the player's selection instruction data 174*a* (step S18).

For example, when the player who operates the game device 10 has issued the selection instruction that instructs to set the basic position of the character OB1 to the left side, the image from the first virtual camera 300A is selected as the game image, and the game image in which the basic position of the character OB1 is set to the left side (see FIG. 10A, for example) is displayed on the display 20.

When the player who operates the game device 10 has issued the selection instruction that instructs to set the basic position of the character OB1 to the right side, the image from the second virtual camera 300B is selected as the game image, and the game image in which the basic position of the character OB1 is set to the right side (see FIG. 10B, for example) is displayed on the display 20.

When the above process has been completed, the battle game using each game device 10 starts (step S20).

The player's character OB1 and the opponent's character OB2 are displayed on the game device 10 operated by each player so that the player's character OB1 and the opponent's character OB2 situated on either the right side or the left side face each other, and the player enjoys the game by operating the character OB1 or the character OB2 by operating the operation section 30 while watching the game screen.

According to one embodiment of the invention, since the player who operates each game device 10 can arbitrarily set the basic position of the character OB on the right side or the left side within the screen, each player can enjoy the game in a state in which the character OB1 is displayed at the desired basic position.

Each game device 10 transmits and receives the operation signal that represents the operation performed by each player on the operation section 30 as the operation code data 176*a* and the operation code data 176*b* in a predetermined cycle (e.g., every 1/60th of a second). Each game device 10 independently calculates the object space using the above data, and displays the resulting game screen. Since it suffices to exchange the operation code data 176*a* and the operation code data 176*b* between the game devices 10, it is possible to reduce the amount of data exchanged between the game devices 10, and the player can enjoy the battle game almost in real time (steps S30 to 60).

In one embodiment of the invention, the first virtual camera 300A and the second virtual camera 300B are controlled when the game has started so that the first virtual camera 300A and the second virtual camera 300B are situated to be point-symmetrical or plane-symmetrical depending on the state of the game.

<Point-Symmetrical Control Process>

For example, the first virtual camera 300A and the second virtual camera 300B are controlled so that the first virtual camera 300A and the second virtual camera 300B are situated to be point-symmetrical with respect to the reference point M in the attack-defense mode (step S30) in which the players respectively control the character OB1 and the character OB2 using the operation section 30 while issuing an attack-defense input instruction (step S40).

In the attack-defense mode, the character OB1 and the character OB2 make an attack-defense motion while moving two-dimensionally or three-dimensionally within the object space based on an operation input performed by each player.

Figure 6:
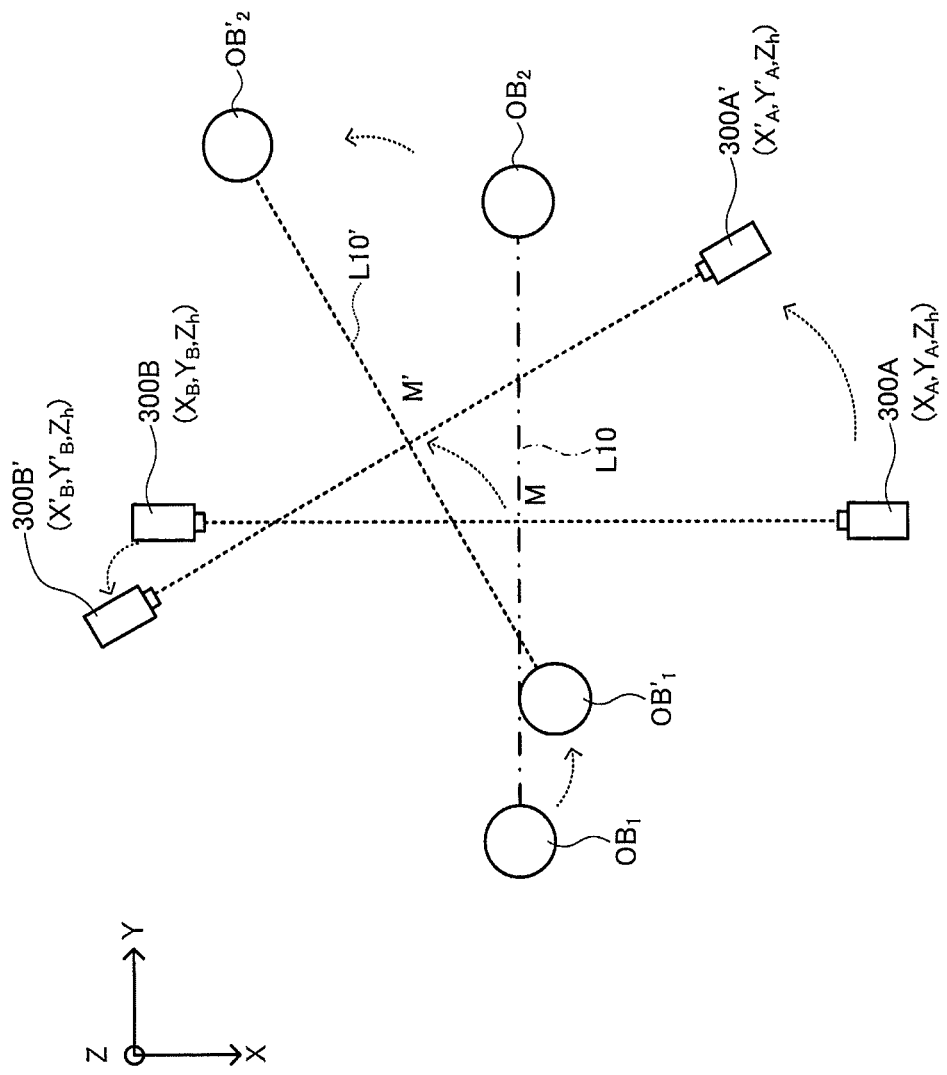
FIG. 6 is a diagram illustrating an example of a point-symmetrical control process performed on a first virtual camera and a second virtual camera.

For example, when the first character OB1 and the second character OB2 have respectively moved to a position OB1' and a position OB2' within the object space (see FIG. 6), the reference point M and the reference line L10 respectively move to a position M' and a position L10'.

The first virtual camera 300A and the second virtual camera 300B are controlled to follow the movement of the first character OB1 and the second character OB2 so that the first virtual camera 300A and the second virtual camera 300B are situated to be point-symmetrical with respect to the reference point situated at the position M'.

In this case, camera work may be too quick if the first virtual camera 300A and the second virtual camera 300B are controlled to follow the movement of the first character OB1 and the second character OB2 in total synchronization so that the first virtual camera 300A and the second virtual camera 300B are situated to be point-symmetrical with respect to the reference point, for example. In one embodiment of the invention, the first virtual camera 300A and the second virtual camera 300B are controlled to follow the movement of the first character OB1 and the second character OB2 so that the position and the direction of the first virtual camera 300A and the position and the direction of the second virtual camera 300B change slowly. For example, it is possible to provide a game image that can be easily observed by each player by employing a configuration in which the position and the direction of the first virtual camera 300A and the position and the direction of the second virtual camera 300B are changed slowly using a virtual damper.

As described above, the first virtual camera 300A and the second virtual camera 300B are controlled so that the first virtual camera 300A and the second virtual camera 300B are situated to be point-symmetrical with respect to the reference point M such that the character OB1 and the character OB2 are evenly displayed on either the right side or the left side within the game screen in the attack-defense mode in which the players respectively control the character OB1 and the character OB2 while issuing an attack-defense input instruction. Therefore, the character OB1 and the character OB2 are displayed on the game device 10 operated by each player so that the character OB1 and the character OB2 can be easily observed, and each player can easily cause the player's character to make an attack-defense motion.

In the attack-defense mode, the first virtual camera 300A and the second virtual camera 300B are basically controlled so that the first virtual camera 300A and the second virtual camera 300B are situated to be point-symmetrical such that a line that connects the first virtual camera 300A and the second virtual camera 300B is orthogonal to the reference line L10. Note that the first virtual camera 300A and the second virtual camera 300B may be controlled so that the first virtual camera 300A and the second virtual camera 300B are situated to be point-symmetrical such that a line that connects the first virtual camera 300A and the second virtual camera 300B is diagonal to the reference line L10 (see the position 300A' and the position 300B' in FIG. 8) depending on the state of the game, for example.

In this case, it is possible to display an image in which the player's character OB is displayed diagonally (from the front side) over the shoulder of the opponent's character OB, for example.

<Line-Symmetrical Control Process>

In one embodiment of the invention, when an attack input performed by one of the players has succeeded, the mode is switched to an attack effect mode in which each character (OB1 and OB2) within the object space is automatically controlled according to the corresponding attack motion data (step S32). For example, when the player who operates the character OB1 has succeeded in sequential attack inputs (e.g., combo), the mode is switched to the attack effect mode in which the character OB1 makes the corresponding sequential attacks on the character OB2 according to a given motion program.

In the attack effect mode (step S32), the first virtual camera 300A and the second virtual camera 300B are controlled so that the first virtual camera 300A and the second virtual camera 300B are line-symmetrical with respect to the reference line L10.

For example, when the mode has been switched to the attack effect mode in which the character OB1 makes the corresponding sequential attacks on the character OB2 according to a given motion program, the first virtual camera 300A and the second virtual camera 300B are controlled so that the first virtual camera 300A and the second virtual camera 300B are line-symmetrical at the position 300A' and the position 300B' (see FIG. 7).

This makes it possible to display a game image in which the character OB1 makes the corresponding sequential attacks (a series of motions) on the character OB2 according to a given motion program so that the character OB1 is displayed diagonally (from the front side), and improve the effect of the game image.

<Look-At-Camera Control Process>

When the character OB1 has succeeded in making sequential attacks on the character OB2, and defeated the character OB2, the character OB1 strikes a victory pose according to given motion data, and gives a joyful expression while looking at the camera (look-at-camera mode) (step S34). When the look-at-camera mode has started, a look-at-camera control process that photographs the character OB1 using a third virtual camera (not illustrated in the drawings) so that the character OB1 looks at the third virtual camera is performed (step S60).

It is possible to provide a more effective game image by thus providing a victory effect.

In one embodiment of the invention, the above process (steps S30 to 34, S40, S50, and S60) is repeated until the game ends (step S36).

It is possible to provide a highly effective game image that allows the player to easily operate the character by controlling the virtual camera as described above.

6. Additional Embodiments

The invention is not limited to the above embodiments. Various modifications and variations may be made of the above embodiments. Any term cited with a different term having a broader meaning or the same meaning at least once in the specification and the drawings may be replaced by the different term in any place in the specification and the drawings.

The invention includes various other configurations substantially the same as the configurations described in connection with the above embodiments (e.g., a configuration having the same function, method, and results, or a configuration having the same objective and effects). The invention also includes a configuration in which an unsubstantial part (element) described in connection with the above embodiments is replaced with another part (element). The invention also includes a configuration having the same effects as those of the configurations described in connection with the above embodiments, or a configuration capable of achieving the same objective as that of the configurations described in connection with the above embodiments. The invention further includes a configuration in which a known technique is added to the configurations described in connection with the above embodiments. The above embodiments (examples) can be combined in any possible way.

The game device is not limited to an arcade game device, but may be a consumer game device, a mobile phone, a portable terminal, or a portable game device.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. Game devices including a first game device and a second game device that exchange operation information about a first character that is controlled based on an operation performed by a first player and operation information about a second character that is controlled based on an operation performed by a second player in a game system that implements a game in which the first character and the second character battle each other within an object space, each of the game devices comprising:
   a character control section that controls the first character and the second character within the object space based on the operation information about the first character and the operation information about the second character;
   a virtual camera control section that controls a first virtual camera and a second virtual camera that respectively photograph at least one of the first character and the second character based on a position of at least one of the first character and the second character;
   a display control section that displays the object space photographed by one of the first and second virtual cameras as a game image; and
   a position selection section that determines whether to set a basic position of one of the first and second characters within the game image to a right side or a left side with respect to a basic position of the other of the first and second characters based on a selection instruction issued by one of the first and second players to one of the first and second game devices,
   the virtual camera control section controlling the first virtual camera and the second virtual camera so that the first virtual camera and the second virtual camera are situated to be point-symmetrical, line-symmetrical, or plane-symmetrical with respect to a reference point, a reference line, or a reference plane that is defined by a first position within the object space that is linked to the first character and a second position within the object space that is linked to the second character, and determining whether to display the object space photographed by the first virtual camera or the object space photographed by the second virtual camera as the game image based on the basic position of one of the first and second characters determined by the position selection section.

2. The game device as defined in claim 1,
   wherein the virtual camera control section controls the first virtual camera and the second virtual camera so that the first virtual camera and the second virtual camera are situated to be point-symmetrical, line-symmetrical, or plane-symmetrical with respect to the reference point, the reference line, or the reference plane depending on a state of a battle between the first character and the second character.

3. The game device as defined in claim 2,
   wherein the virtual camera control section places the first virtual camera and the second virtual camera to be point-symmetrical with respect to the reference point, the reference line, or the reference plane when the first player and the second player respectively cause the first character and the second character to make an attack-defense motion, and places the first virtual camera and the second virtual camera to be line-symmetrical with respect to the reference point, the reference line, or the reference plane when an attack has succeeded.

4. The game device as defined in claim 1,
   wherein the operation information about the first character and the operation information about the second character that are exchanged between the first game device and the second game device include information about the selection instruction received by each of the first game device and the second game device, and
   the character control section performs a process that converts movement instruction information included in the operation information about the first character and the operation information about the second character into movement instruction information that corresponds to a world coordinate system of the object space based on the selection instruction received by each of the first game device and the second game device.

5. The game device as defined in claim 1,
   wherein the virtual camera control section places the first virtual camera and the second virtual camera to be symmetrical with respect to the reference point or the reference line defined by two-dimensional XY coordinates in an XYZ world coordinate system of the object space.

6. The game device as defined in claim 1,
   wherein, when the reference plane is a plane that includes the reference line and is orthogonal to an XY plane in an XYZ world coordinate system of the object space, the virtual camera control section places the first virtual camera and the second virtual camera to be symmetrical with respect to the reference plane.

7. A game system that implements a game in which a first character and a second character battle each other, the first character being controlled based on an operation performed by a first player, and the second character being controlled based on an operation performed by a second player, the game system comprising:
   a character control section that controls the first character and the second character within an object space based on operation information about the first character and operation information about the second character;
   a virtual camera control section that controls a first virtual camera and a second virtual camera that respectively photograph at least one of the first character and the second character based on a position of at least one of the first character and the second character;
   a display control section that displays the object space photographed by one of the first and second virtual cameras as a game image; and
   a position selection section that determines whether to set a basic position of one of the first and second characters within the game image to a right side or a left side with respect to a basic position of the other of the first and second characters based on a selection instruction issued by one of the first and second players, the virtual camera control section controlling the first virtual camera and the second virtual camera so that the first virtual camera and the second virtual camera are situated to be point-symmetrical, line-symmetrical, or plane-symmetrical with respect to a reference point, a reference line, or a reference plane that is defined by a first position within the object space that is linked to the first character and a second position within the object space that is linked to the second character, and determining whether to display the object space photographed by the first virtual camera or the object space photographed by the second virtual camera as the game image based on the basic position of one of the first and second characters determined by the position selection section.

8. A computer-readable non-transitory information storage medium that stores a program that causes a computer to function as game devices including a first game device and a second game device that exchange operation information about a first character that is controlled based on an operation performed by a first player and operation information about a second character that is controlled based on an operation performed by a second player in a game system that implements a game in which the first character and the second character battle each other within an object space, the program causing the computer to further function as:
- a character control section that controls the first character and the second character within the object space based on the operation information about the first character and the operation information about the second character;
- a virtual camera control section that controls a first virtual camera and a second virtual camera that respectively photograph at least one of the first character and the second character based on a position of at least one of the first character and the second character;
- a display control section that displays the object space photographed by one of the first and second virtual cameras as a game image; and
- a position selection section that determines whether to set a basic position of one of the first and second characters within the game image to a right side or a left side with respect to a basic position of the other of the first and second characters based on a selection instruction issued by one of the first and second players to one of the first and second game devices,
- the virtual camera control section controlling the first virtual camera and the second virtual camera so that the first virtual camera and the second virtual camera are situated to be point-symmetrical, line-symmetrical, or plane-symmetrical with respect to a reference point, a reference line, or a reference plane that is defined by a first position within the object space that is linked to the first character and a second position within the object space that is linked to the second character, and determining whether to display the object space photographed by the first virtual camera or the object space photographed by the second virtual camera as the game image based on the basic position of one of the first and second characters determined by the position selection section.

9. A computer-readable non-transitory information storage medium that stores a program that causes a computer to function as a game system that implements a game in which a first character and a second character battle each other, the first character being controlled based on an operation performed by a first player, and the second character being controlled based on an operation performed by a second player, the program causing the computer to further function as:
- a character control section that controls the first character and the second character within an object space based on operation information about the first character and operation information about the second character;
- a virtual camera control section that controls a first virtual camera and a second virtual camera that respectively photograph at least one of the first character and the second character based on a position of at least one of the first character and the second character;
- a display control section that displays the object space photographed by one of the first and second virtual camera as a game image; and
- a position selection section that determines whether to set a basic position of one of the first and second characters within the game image to a right side or a left side with respect to a basic position of the other of the first and second characters based on a selection instruction issued by one of the first and second players,
- the virtual camera control section controlling the first virtual camera and the second virtual camera so that the first virtual camera and the second virtual camera are situated to be point-symmetrical, line-symmetrical, or plane-symmetrical with respect to a reference point, a reference line, or a reference plane that is defined by a first position within the object space that is linked to the first character and a second position within the object space that is linked to the second character, and determining whether to display the object space photographed by the first virtual camera or the object space photographed by the second virtual camera as the game image based on the basic position of one of the first and second characters determined by the position selection section.

* * * * *